MAGNETIC STORAGE DEVICE

Filed Sept. 13, 1954

INVENTOR.
MOE L AITEL
BY Morris L. Rabkin
ATTORNEY 3,056,114

MAGNETIC STORAGE DEVICE

Moe L. Aitel, Haddon Heights, N.J., assignor to Radio Corporation of America, a corporation of Delaware Filed Sept. 13, 1954, Ser. No. 455,391
8 Claims. (Cl. 340—174)

This invention relates to information storage, and particularly to an improved magnetic device for information storage.

In present-day information handling and computing machines, wide use is made of magnetic cores for storing information. For example, in an article by Jan A. Rajchman published in the October, 1953 issue of the Proceedings of the I.R.E., entitled "A Myriabit Magnetic-Core Matrix Memory," there is described a coincident-current random access memory for storing information in a planar array of magnetic cores. In the case of individual cores used in a magnetic memory, the physical size is selected to be as small as can be conveniently handled in order to minimize the current and power driving requirements. When a large number of individual cores are employed, the labor in the individual handling of the cores is extremely tedious, time-consuming, and results in increasing the per core cost of a magnetic memory by a sizeable factor.

The magnetic material employed in fabricating the cores is characterized by a substantially rectangular hysteresis loop. A hysteresis loop for a magnetic material is a curve showing, for each value of a cyclical magnetizing force, two values of the magnetic induction, one when the magnetizing force is increasing, the other when it is decreasing. A rectangular hysteresis loop is one which is substantially rectangular in shape. It is assumed, as usual, that the curve is plotted in rectangular coordinates with magnetic flux (induction) plotted along the vertical axis, and the magnetizing force plotted along the horizontal axis.

In a given volume of magnetic material, it is convenient to consider the absolute value of the vector of magnetic induction "B" as defining the state of remanence of that volume. The state of remanence in a volume depends upon the magnetic properties of the material and the previous histories of excitation. Each state of remanence is defined by an intersection of the hysteresis loop and the magnetic induction "B" axis. The intersections of the upper and lower horizontal portions respectively of each rectangular hysteresis loop with the vertical flux axis represent two states of saturation at remanence. One state (P) is represented by the intersection of the upper horizontal portion of the hysteresis loop with the vertical flux axis, and the other state (N) is reperesented by the intersection of the lower horizontal portion of the hysteresis loop with the vertical flux axis.

Among the class of materials exhibiting the desired rectangular hysteresis loop are certain furomagnetic spinel materials such as manganese-magnesium. By means of the present invention, rectangular hysteresis loop magnetic material is employed to obtain advantages found in the prior magnetic-core storage devices.

It is an object of the present invention to provide an improved magnetic storage device.

A further object of the present invention is to provide an improved magnetic storage device which retains the advantages of magnetic cores as discrete storage elements but, at the same time, eliminates the difficulties of handling individual cores.

Still another object of the present invention is to provide an improved random access storage device which is relatively inexpensive to fabricate.

The above and further objects of the present invention are carried out in one particular embodiment by utilizing apertured plates which are fabricated from magnetic material characterized by a substantially rectangular hysteresis loop. A plurality of digit-storing apertures are fabricated in the plate. Adjacent storing apertures are substantially physically and magnetically separated by isolating apertures which are located in the plate with respect to the storage apertures in such a manner that any one storage aperture is substantially physically and magnetically isolated from its neighbors. Information in the form of a binary digit or "bit" is stored in the magnetic material, limiting a particular storing aperture of the plate by passing a suitable excitation current through the aperture to excite the magnetic material to one or the other of its two states (P or N) of saturation at remanence. Accordingly, a "binary one" or a "binary zero" may be represented by the state (P or N) of remanent magnetic induction of the magnetic material, limiting a particular storing aperture, just as an information "bit" is represented by the state of remanent induction of a core in the prior magnetic-core storage devices. The isolating apertures serve to prevent cross-talk between adjacent storing apertures. Thus, the provision of isolating apertures in accordance with the present invention permits the practical use of the magnetic material bounding each storing aperture of the magnetic plate as a magnetic memory core. Therefore, magnetic material limiting each individual storing aperture is referred to herein as a magnetic core.

The information stored in a particular core may be read out by applying a current excitation of suitable polarity and proper amplitude to the magnetic core and observing the amplitude of a voltage induced in an output winding.

The novel features and advantages of this invention, as well as the invention itself, will be more fully appreciated from the following detailed description when read in connection with the accompanying drawing in which.

Figure 1:
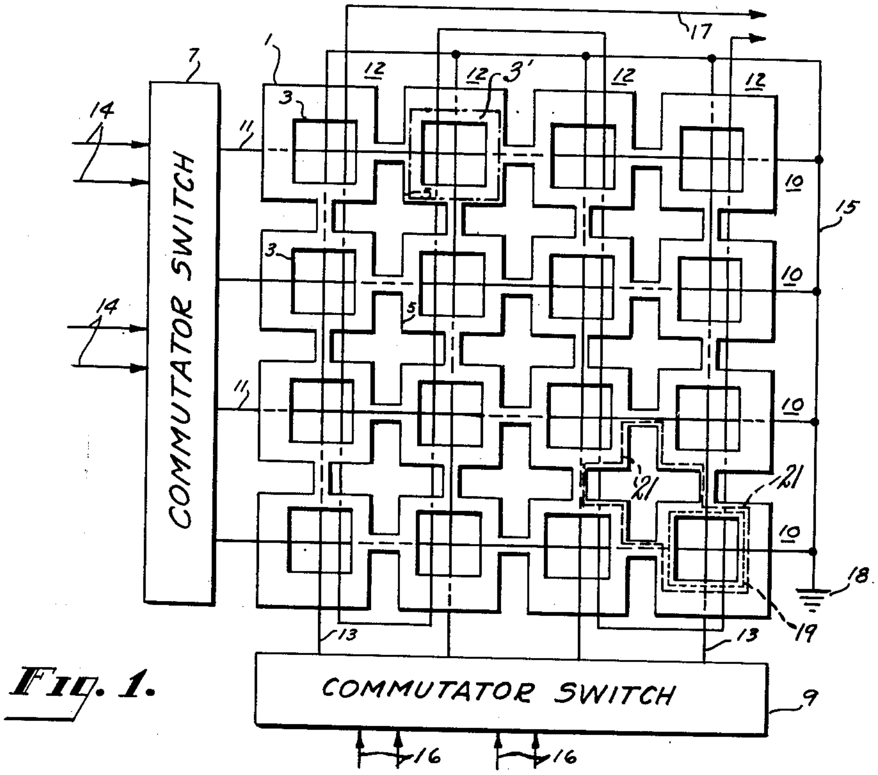
FIG. 1 is a diagrammatic view of a magnetic system employing one form of an apertured plate according to the invention.

Referring to FIG. 1, there is shown an apertured plate 1 which is fabricated from a rectangular hysteresis loop magnetic material. A plurality of rectangular-shaped apertures 3 are molded in the plate 1. A plurality of isolating apertures 5 are also molded in the plate 1. Each of the apertures 3 and 5 extends through the plate 1. The apertures 3 are physically separated from each other by the cross-shaped isolating apertures 5, and the material bounding the apertures 3 are cores 3'. However, a small island of magnetic material sufficient to furnish mechanical strength is provided between the arms of the isolating apertures 5. The shape of the man apertures 3 and the isolating apertures 5 are illustrative only, and other shapes may be employed if desired. For example, the main apertures 3 and the isolating apertures 5 may be circular. Typically, the magnetic plate 1 is molded from a substantially homogenous ferromagnetic ceramic material. The apertured plate 1 may then be annealed at a suitable temperature to obtain the desired magnetic characteristics.

The magnetic cores 3' conveniently may be arranged in a geometric pattern corresponding to horizontal rows 10 and vertical columns 12. Each magnetic core 3' of each row 10 is threaded by a separate row winding 11 through the apertures 3 in a row, and each core 3′ of each column 12 is threaded by a column winding 13 through the apertures 3 in a column. The column windings 12 and the row windings 11 are connected at one end to a common connection 15. The common connection 15 is connected to a common ground 18, as shown. The other end of each row winding 11 is connected to a commutator switch 7, and the other end of each column winding 13 is connected to a commutator switch 9. One row winding 11 and one column winding 13 intersect in each of the magnetic cores 3′. The commutator switches 7 and 9 are similar, and may be similar to the magnetic commutator switch described in an article published by Jan. A Rajchman in the June, 1952 issue of the RCA Review at pp. 183–201 entitled "Static Magnetic Matrix Memory and Switching Circuits." Briefly a magnetic commutator switch is a magnetic core device which may have $k$ inputs and $2^k$ outputs. Each input channel may have two leads. By selecting any given combination of input channels, one and only one output is selected. A current excitation pulse is furnished by the commutator switch to the selected output.

Figure 2:
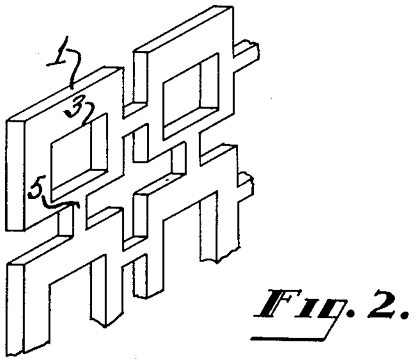
FIG. 2 is a three-dimensional view of a section of the apertured plate of FIG. 1.

FIG. 2 is a three-dimensional view of a section of the apertured plate 1 of FIG. 1 and shows in greater detail how the isolating apertures 5 separate the magnetic cores 3′.

Briefly, a method of representing a binary digit by the state of saturation at remanence of a given core may comprise the method of selecting the given core by the excitation of the one row winding 11 and the one column winding 13 which intersect in the given core. The state (P or N) of saturation at remanence of the given core is determined by the polarity of the half-excitation current pulses which are applied to the one row and one column winding by the commutator switches 7 and 9. The method of reading out a binary digit from a given 3′ involves the application of half-excitation current pulses to selected row and column windings which intersect in the given core and observing the amplitude of the corresponding voltage induced in the output winding 17. For example, a relatively high output voltage is observed when a binary zero is stored in the given core and a relatively low output voltage is observed when a binary one is stored in the given core. By a relatively low voltage is meant that the amplitude of the voltage induced in the output winding is five or more times less than the amplitude of a relatively high output voltage.

One suitable method of storing a binary digit in, and reading a binary digit out of, a given core 3′ is described in detail in an application, Serial No. 375,470, now Patent No. 2,784,391 entitled, "Memory System," filed by Jan A. Rajchman and Richard O. Endres on August 20, 1953.

Other methods of storing a binary digit in, and reading a binary digit out of, a given core may be employed. Various combinatorial networks for switching information are described in the aforementioned article entitled, "Static Magnetic Memory and Switching Circuits," by Jan A. Rajchman.

Two different flux paths are important in considering the combined effect of the two half excitation current pulses on the magnetic material. One flux path is that which includes the magnetic material in a magnetic core 3′, and the other flux path is that which includes both the magnetic material in a magnetic core 3′ and the magnetic material limiting an isolating aperture 5. The two different flux paths are respectively shown by the dotted lines 19 and 21 of FIG. 1. The longer flux path 21 is approximately three times the length of the shorter flux path 19.

FIG. 2 is an illustrative graph of the magnetizing force (H) plotted along the vertical axis versus the ampere-turns (AT) plotted along the horizontal axis. The lines 19′ and 21′ respectively represent the variation of magnetizing force H with ampere-turns AT in the two flux paths 19 and 21 of FIG. 1 when a half-excitation current pulse is applied both to the row winding 11 and the column winding 13 of a magnetic core 3′.

Note that the slope of the line 21′ is much less than the slope of the line 19′. Consequently, for a given value of ampere-turns in a magnetic core 3′, such as the value represented by the point 23, the corresponding magnetizing force represented by the point 27 in the flux path 19 is many times greater than the magnetizing force H in the longer flux path 21 represented by the point 25. The increased magnetizing force in the flux path 19 results because the flux path 21 is about three times as long as the flux path 19. Consequently, the reluctance of the flux path 21 is approximately three times as great as the reluctance of the flux path 19 and the resulting magnetizing force in the longer path 21 is proportionally less. An analogy may be drawn to an electrical circuit having a pair of parallel resistors connected across a voltage source where the value of resistance of one of the paralleled resistors is approximately three times as great as the other. The resulting current flow divides in the parallel branches in a manner inversely proportional to the value of the resistors, with three-quarters of the total current flowing in the branch having the smaller resistance and one-quarter of the total current flowing in the branch having the larger resistance. The magnetic flux may be considered as the analogue of the resistence. Accordingly, for a given value of ampere-turns, the magnetic flux divides in the parallel branches of the flux paths 19 and 21 in inverse proportionality to the reluctance.

The effect of the magnetizing forces represented by the points 27 and 25 on the magnetic material in the respective flux paths 19 and 21 is explained with reference to FIG. 4. A typical somewhat idealized rectangular hysteresis loop is shown for the magnetic material from which the plate 1 of FIG. 1 is constructed. The magnetic induction (flux) B is plotted along the vertical axis, and the magnetizing force H is plotted along the horizontal axis. The two states of saturation at remanence are represented by the points P and N, respectively. At a value equal to or greater than the value of magnetizing force represented by the point $H_c$, the magnetic material changes its state of saturation at remanence from state N to state P.

If the magnetic material is already saturated at state P of saturation at remanence, the magnetizing force, represented by the point $H_c$, drives it further into saturation at state P. However, the motion of a point from state P of saturation at remanence to the right is reversible, and, when the magnetizing force is removed, the magnetic material returns to the state of saturation at remanence represented by the point P.

Figure 3:
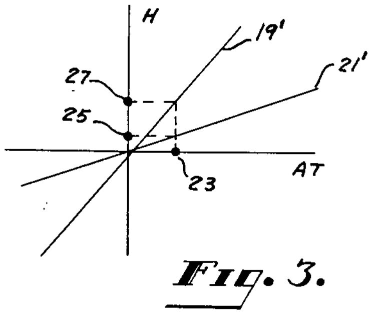
FIG. 3 is an illustrative graph of magnetizing force versus ampere turns which relates to the apertured plate of FIG. 1.
Figure 4:
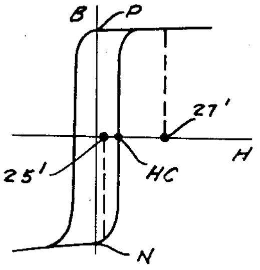
FIG. 4 is an illustrative hysteresis loop relating to the magnetic material from which the apertured plate of FIG. 1 is fabricated.

The magnetizing forces represented by the points 27 and 25 of FIG. 3, and corresponding to the value of ampere-turns represented by the point 23, are shown in FIG. 4 by the points 27′ and 25′ which are located on the horizontal axis. Note that the value of magnetizing force represented by point 27′ is sufficient to reverse the state of the magnetic material from state N to state P. Note also that the value of magnetizing force represented by point 25′ is insufficient to reverse the state of the magnetic material. Thus, when the magnetizing force represented by point 27′ is removed, the magnetic material upon which the force is exerted is at a state P of saturation at remanence. When the magnetizing force represented by the point 25′ is removed, the magnetic material upon which the force is exerted returns to the state N of saturation at remanence.

Therefore, referring to the flux paths 19 and 21 of FIG. 1, the combined effect of the half-excitation current pulses reverses only the state of the magnetic material included in the flux path 19. There is some magnetizing force exerted along the longer path 21, but this magnetizing force is insufficient to reverse the state of the magnetic material in the shunt flux path around an isolating aperture 5. Consequently, the cross-talk between adjacent magnetic cores 3′ is limited by the isolating apertures 5.

The above explanation in connection with FIG. 3 and FIG. 4 is greatly simplified and is presented only for the purpose of clarifying the function of the isolating apertures 5. The leakage flux has been neglected in the explanation. Also, it is understood that the magnetic material is not perfectly rectangular and that the half-amplitude excitation current pulses cause the state of the magnetic material to change along a minor hysteresis loop (not shown) with a slight shifting of the points P and N of saturation at remanence along the magnetic induction axis B. The change of flux produced by the half-excitation current pulses induces an unwanted or noise voltage in the output winding 17.

The checkerboard winding technique employed in threading the row, column and output windings through the magnetic cores 3′ of FIG. 1 reduces the noise voltage to a large extent. Note that each row winding 11 reverses its sense in every other magnetic core 3′ of a row 10. For example, the row winding 11 of the first core of the top row is threaded downwardly (as viewed in the drawing) through the core. In the following core 3′ of the same row, the row winding 11 is threaded upwardly through the core, and so on. The column windings 13 are similarly threaded through each core 3′ of a column 12. In any given core, however, both the row winding 11 and the column winding 13 are in the same sense. Thus, in the uppermost core 3′ of the first column 12, both the row winding 11, and the column winding 13, are threaded downwardly (as viewed in the drawing) through the core. Consequently, the effect of the half-excitation current pulse applied to a selected row winding 11 and a selected column winding 13 is always additive in any given magnetic core 3′.

The noise signals induced in the output winding 17 by the half-excited cores of a row, threaded by a selected row winding 11 and the selected column winding 13, tend to cancel each other. The voltage cancellation results, for example, because one core of a row 10 induces a noise voltage of one polarity in the output winding 17, the next core 3′ of the row 10 induces a noise voltage of the opposite polarity in the output winding 17, and so on. The noise voltages induced in the output winding 17 by the half-excited cores 3′ of the selected column similarly cancel.

The checkerboard winding technique is described in detail in an application of Jan A. Rajchman, Serial No. 275,621, filed March 8, 1952 entitled "Magnetic Information Handling System," now Patent No. 2,691,154, issued October 5, 1954.

Even greater packing density may be achieved if the magnetic material limiting every aperture is employed for storing information.

Other arrays of magnetic cores 3′ than the square array illustrated in FIG. 1 may be employed. A rectangular or hexagonal array of magnetic cores may be used. The magnetic cores may be arranged in a Christmas-tree array or any other convenient one.

Even greater isolation between the magnetic cores may be obtained, when the cores are arranged in rows and columns, by using only every other core of a row and column to store a binary digit. The non-storing cores then serve the function of a dummy core. When dummy cores are used, a correspondingly large excitation current can be applied to the selected excitation windings, and correspondingly larger output voltage is induced in the output winding.

There has been described herein an improved magnetic storage device which is readily fabricated from inexpensive magnetic material. The apertured plate may be provided with a plurality of magnetic cores for storing a like plurality of different binary digits. Each of the several magnetic cores may be separated by an isolating aperture. The storage device of the present invention is capable of many further embodiments, within the scope of the appended claims, as will be apparent to those skilled in the art.

What is claimed is:

1. A magnetic device comprising a plate of magnetic material characterized by having a substantially rectangular hysteresis loop and having two states of remanence, said plate having first and second pluralities of apertures therein, said second apertures having a shape different than said first apertures, the said material bounding each different one of said first plurality of said apertures defining a separate magnetic core, said magnetic cores being substantially physically and magnetically isolated the one from the other by different ones of said second plurality of apertures, and means to excite a selected one of said magnetic cores selectively to one or the other of said two states of remanence.

2. A magnetic device comprising a plate of magnetic material characterized by having a substantially rectangular hysteresis loop, said plate having first and second pluralities of apertures therein, said second apertures having a shape different than said first apertures, the said material bounding each different one of said first plurality of said apertures defining a separate magnetic core, and said magnetic cores being arranged in a regular geometric array and being substantially physically and magnetically isolated one from the other by different ones of said second plurality of apertures.

3. A plate of magnetic material characterized by having a substantially rectangular hysteresis loop, said plate having a plurality of storing apertures, a plurality of magnetic cores each including a part of said plate about a different one of said storing apertures, said plate having a plurality of cross-shaped isolating apertures therein, said isolating apertures substantially separating said magnetic cores one from the other except for certain portions of said magnetic material which mechanically connect said cores without affording any substantial magnetic path between any of said cores.

4. A plate of magnetic material characterized by having a substantially rectangular hysteresis loop and having two remanent states, said plate having a plurality of storing apertures, a plurality of magnetic cores each including a part of said plate, about a different one of said storing apertures, said plate having a plurality of cross-shaped isolating apertures therein, said isolating apertures substantially separating said magnetic cores one from the other except for certain portions of said magnetic material which mechanically connect said cores without affording any substantial magnetic path between any of said cores, and means to excite a selected one of said magnetic cores selectively to one or the other of said two remanent states.

5. A magnetic storage device comprising a plate of magnetic material characterized by having a substantially rectangular hysteresis loop, said plate having a plurality of storing apertures, a plurality of magnetic cores each including a part of said plate about a different one of said storing apertures, said magnetic cores being arranged in rows and column, said plate having a plurality of isolating apertures therein, said magnetic cores of each row being substantially physically and magnetically separated one from the other by portions of two different isolating apertures, and said magnetic cores of each column being substantially physically and magnetically separated one from the other by portions of two other different isolating apertures, certain portions of said magnetic material mechanically connecting said cores without affording any substantial magnetic path between any of said cores.

6. A device comprising a plate of magnetic material characterized by having a substantially rectangular hysteresis loop, said plate having a plurality of apertures therein, a plurality of magnetic storage cores in and a part of said plate, each said magnetic core comprising the material about a different one of said apertures, remaining ones of said apertures being isolating apertures for separating said cores substantially physically and magnetically from each other, said isolating apertures having a shape different than any one of said magnetic core apertures, said cores being arranged in rows and columns, a separate row winding threading each magnetic core of a different row, a separate column winding threading each magnetic core of a different column, and an output winding threading each of said cores.

7. A plate of magnetic material characterized by having a substantially rectangular hysteresis loop, said plate having a plurality of storage apertures, a plurality of magnetic cores each including a part of said plate about a different one of said storage apertures, and said plate having a plurality of isolating apertures, said isolating apertures each having a shape different from the shape of said storage apertures, said isolating apertures substantially physically and magnetically separating said magnetic cores one from the other except for certain portions of said magnetic material which mechanically connect said cores without affording any substantial magnetic path between any of said cores.

8. A magnetic device comprising a plate of magnetic material characterized by having a substantially rectangular hysteresis loop, said plate having first and second pluralities of apertures, the said material bounding each different one of said first plurality of apertures defining a separate magnetic core, said magnetic cores being substantially physically and magnetically isolated one from the other by different ones of said second plurality of apertures, said isolating apertures having a different shape from said first plurality of apertures.

References Cited in the file of this patent

UNITED STATES PATENTS

| | | |
|---|---|---|
| 1,105,014 | Austin | July 28, 1914 |
| 2,616,070 | Corbino | Oct. 28, 1952 |
| 2,640,164 | Giel et al. | May 26, 1953 |
| 2,700,150 | Wales | Jan. 18, 1955 |
| 2,724,103 | Ashenhurst | Nov. 15, 1955 |
| 2,732,542 | Minnick | Jan. 24, 1956 |
| 2,825,046 | Herbert et al. | Feb. 25, 1958 |
| 2,912,677 | Ashenhurst | Nov. 10, 1959 |

OTHER REFERENCES

Publication, Edvac Progress Report #2, June 30, 1946, 340–174.6 (pages PY-0-165,4-23).